(12) United States Patent
Hinckley

(10) Patent No.: US 10,191,940 B2
(45) Date of Patent: Jan. 29, 2019

(54) GESTURE-BASED SEARCHING

(71) Applicant: Microsoft Technology Licensing, LLC, Redmond, WA (US)

(72) Inventor: Kenneth P. Hinckley, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/572,527

(22) Filed: Dec. 16, 2014

(65) Prior Publication Data

US 2015/0106399 A1    Apr. 16, 2015

Related U.S. Application Data

(63) Continuation of application No. 11/849,469, filed on Sep. 4, 2007.

(51) Int. Cl.
| | | |
|---|---|---|
| *G06F 3/0488* | (2013.01) | |
| *G06F 17/30* | (2006.01) | |
| *G06F 3/01* | (2006.01) | |
| *G06F 3/0482* | (2013.01) | |
| *G06K 9/20* | (2006.01) | |

(52) U.S. Cl.
CPC ........ *G06F 17/30424* (2013.01); *G06F 3/017* (2013.01); *G06F 3/0482* (2013.01); *G06F 3/0488* (2013.01); *G06F 3/04883* (2013.01); *G06F 17/30637* (2013.01); *G06K 9/2081* (2013.01); *G06K 2209/01* (2013.01)

(58) Field of Classification Search
CPC .... G06F 3/017; G06F 3/04883; G06F 3/0487; G06F 3/0488
See application file for complete search history.

(56) References Cited

U.S. PATENT DOCUMENTS

| | | |
|---|---|---|
| 5,007,085 A | 4/1991 | Greanias et al. |
| 5,523,775 A | 6/1996 | Capps |
| 5,724,985 A | 3/1998 | Snell et al. |
| 5,838,326 A | 11/1998 | Card et al. |
| 5,864,848 A | 1/1999 | Horvitz et al. |
| 5,953,735 A * | 9/1999 | Forcier ............... G06F 3/0488 715/273 |
| 5,970,455 A | 10/1999 | Wilcox et al. |

(Continued)

FOREIGN PATENT DOCUMENTS

| | | |
|---|---|---|
| JP | 10207901 | 8/1998 |
| JP | H11-161682 | 6/1999 |

(Continued)

OTHER PUBLICATIONS

Bourteruche et al., "Fuzzy Relative Positioning for On-Line Handwritten Stroke Analysis", Proceedings of IWFHR 2006, Oct. 2006, pp. 1-6.

(Continued)

*Primary Examiner* — Antonio Xavier

(57) ABSTRACT

The claimed subject matter provides a system and/or a method that facilitates in situ searching of data. An interface can receive a flick gesture from an input device. An in situ search component can employ an in situ search triggered by the flick gesture, wherein the in situ search is executed on at least one of a portion of data selected on the input device.

20 Claims, 10 Drawing Sheets

(56) References Cited

U.S. PATENT DOCUMENTS

| | | | |
|---|---|---|---|
| 6,088,032 A | 7/2000 | Mackinlay | |
| 6,286,104 B1 | 9/2001 | Buhle et al. | |
| 6,344,861 B1 | 2/2002 | Naughton et al. | |
| 6,397,213 B1 | 5/2002 | Cullen et al. | |
| 6,457,026 B1 | 9/2002 | Graham et al. | |
| 6,509,912 B1 | 1/2003 | Moran et al. | |
| 6,681,045 B1 | 1/2004 | Lapstun et al. | |
| 6,778,979 B2 | 8/2004 | Grefenstette et al. | |
| 6,829,387 B2 | 12/2004 | Lapstun et al. | |
| 6,867,786 B2 | 3/2005 | Lui et al. | |
| 6,868,525 B1 | 3/2005 | Szabo | |
| 6,941,321 B2 | 9/2005 | Schuetze et al. | |
| 7,030,861 B1 | 4/2006 | Westerman et al. | |
| 7,075,512 B1 | 7/2006 | Fabre et al. | |
| 7,091,959 B1 | 8/2006 | Clary | |
| 7,092,935 B2 | 8/2006 | Yourlo et al. | |
| 7,107,261 B2 | 9/2006 | Farrett | |
| 7,162,088 B2 | 1/2007 | Lapstun et al. | |
| 7,353,246 B1 | 4/2008 | Rosen et al. | |
| 7,400,769 B2 | 7/2008 | Lapstun et al. | |
| 2001/0040551 A1* | 11/2001 | Yates | G06F 1/1626 345/156 |
| 2002/0024500 A1* | 2/2002 | Howard | G06F 3/014 345/158 |
| 2002/0099685 A1 | 7/2002 | Takano et al. | |
| 2002/0151327 A1 | 10/2002 | Levitt | |
| 2002/0169950 A1 | 11/2002 | Esfahani et al. | |
| 2003/0014216 A1* | 1/2003 | Lebow | G06F 17/24 702/179 |
| 2003/0018546 A1 | 1/2003 | Ayala et al. | |
| 2003/0061219 A1 | 3/2003 | Monteverde | |
| 2003/0063136 A1 | 4/2003 | J'maev | |
| 2003/0200306 A1 | 10/2003 | Park et al. | |
| 2003/0214553 A1 | 11/2003 | Dodge | |
| 2004/0030741 A1 | 2/2004 | Wolton et al. | |
| 2004/0143569 A1 | 7/2004 | Gross et al. | |
| 2004/0153311 A1* | 8/2004 | Liu | G06F 17/2735 704/10 |
| 2004/0189720 A1 | 9/2004 | Wilson et al. | |
| 2004/0210602 A1* | 10/2004 | Hillis | G06F 17/3089 |
| 2005/0055628 A1 | 3/2005 | Chen et al. | |
| 2005/0134578 A1 | 6/2005 | Chambers et al. | |
| 2005/0177567 A1 | 8/2005 | Hughes et al. | |
| 2005/0182760 A1 | 8/2005 | Lee et al. | |
| 2005/0183005 A1* | 8/2005 | Denoue | G06F 17/241 715/202 |
| 2005/0193014 A1 | 9/2005 | Prince | |
| 2005/0198593 A1 | 9/2005 | Keely, Jr. et al. | |
| 2005/0229118 A1 | 10/2005 | Chiu et al. | |
| 2005/0246324 A1 | 11/2005 | Paalasmaa et al. | |
| 2005/0264541 A1 | 12/2005 | Satoh | |
| 2006/0001656 A1 | 1/2006 | LaViola, Jr. et al. | |
| 2006/0004739 A1* | 1/2006 | Anthony | G06F 17/30587 |
| 2006/0010373 A1 | 1/2006 | Burns | |
| 2006/0018546 A1 | 1/2006 | Lagardere et al. | |
| 2006/0023945 A1 | 2/2006 | King et al. | |
| 2006/0031755 A1* | 2/2006 | Kashi | G06F 17/242 715/201 |
| 2006/0048070 A1 | 3/2006 | Taylor et al. | |
| 2006/0081714 A1 | 4/2006 | King et al. | |
| 2006/0085767 A1 | 4/2006 | Hinckley et al. | |
| 2006/0089928 A1 | 4/2006 | Johnson | |
| 2006/0125803 A1 | 6/2006 | Westerman et al. | |
| 2006/0155581 A1 | 7/2006 | Eisenberger et al. | |
| 2006/0197756 A1* | 9/2006 | Sun | G06F 3/042 345/179 |
| 2006/0282790 A1 | 12/2006 | Matthews et al. | |
| 2007/0005573 A1 | 1/2007 | Murarka et al. | |
| 2007/0011140 A1 | 1/2007 | King et al. | |
| 2007/0067277 A1 | 3/2007 | Ahn et al. | |
| 2007/0125860 A1* | 6/2007 | Lapstun | G06F 3/0321 235/462.01 |
| 2007/0143312 A1* | 6/2007 | Wiseman | G06F 17/30867 |
| 2007/0146347 A1 | 6/2007 | Rosenberg | |
| 2007/0176898 A1 | 8/2007 | Suh | |
| 2007/0203906 A1 | 8/2007 | Cone et al. | |
| 2007/0219986 A1 | 9/2007 | Egozi | |
| 2007/0233692 A1 | 10/2007 | Lisa et al. | |
| 2007/0244866 A1* | 10/2007 | Mishkanian | G06F 17/3064 |
| 2008/0033931 A1 | 2/2008 | Dole | |
| 2008/0119235 A1* | 5/2008 | Nielsen | G06F 3/0483 455/566 |
| 2008/0178126 A1 | 7/2008 | Beeck et al. | |
| 2008/0195657 A1* | 8/2008 | Naaman | G06K 9/00677 |
| 2008/0250012 A1 | 10/2008 | Hinckley et al. | |
| 2009/0010542 A1 | 1/2009 | Lapstun et al. | |
| 2009/0198674 A1 | 8/2009 | Custis et al. | |
| 2010/0016025 A1* | 1/2010 | Koren | H04L 12/1859 455/566 |
| 2010/0321345 A1 | 12/2010 | Pearce et al. | |
| 2011/0087956 A1* | 4/2011 | Sherman | G09B 5/00 715/233 |

FOREIGN PATENT DOCUMENTS

| | | |
|---|---|---|
| JP | 2001092832 | 4/2001 |
| JP | 2001167124 | 6/2001 |
| JP | 2002108918 | 4/2002 |
| JP | 2003173352 | 6/2003 |
| WO | WO2004088534 | 10/2004 |
| WO | WO2006033068 | 3/2006 |
| WO | WO2006137993 | 12/2006 |

OTHER PUBLICATIONS

Davis et al., "A Framework for Sharing Handwritten Notes", Proceedings fo the 11th Annual ACM Symposium on User Interface Software and Technology, UIST-98 San Francisco, CA, 1998, pp. 119-120.

Dulberg, "An Imprecise Mouse Gesture for the Fast Activation of Controls", IOS Press, 1999, Human-Computer Interaction—INTERACT '99, pp. 1-10.

The European Office Action dated Feb. 24, 2014 for European patent application No. 04019628.9, a counterpart foreign application of U.S. Pat. No. 7,555,705, 10 pages.

The European Office Action dated Aug. 17, 2011 for European patent application No. 04019628.9, a counterpart foreign application of U.S. Pat. No. 7,555,705, 6 pages.

Glance, et al., "Collaborative Document Monitoring", Proceedings of the International ACM SIGGROUP Conference on Supporting Group Work, The Integration Challenge, Sep. 30, 2001, pp. 171-178.

Golovchinsky, et al., "From Reading to Retrieval: Freeform Ink Annotations as Queries", Annual International ACM-SIGIR Conference on Research and Development in Information Retrieval, University of California, Berkely, USA, Aug. 1, 1999, pp. 19-25.

Google Search Engine, Retrieved on Oct. 27, 2011 from internet archive at <<http://web.archive.org/web/20031008124818/http://www2.google.com/>>, Oct. 8, 2003, 1 pg.

Gouveia, et al., "Informing a Information Discovery Tool for Using Gesture", In the First Open International Conference on Gestures: Meaning and Use, Porto, PT, Apr. 2000, 2 pgs.

Huang et al., "A Fuzzy Semantic Approach to Retrieving Bird Information Using Handheld Devices," IEEE Intelligent Systems, vol. 20, No. 1, Jan./Feb. 2005, pp. 16-23.

Luk, et al., "A Survey in Indexing and Searching XML Documents", Journal of the American Society for Information Science and Technology, vol. 53, No. 6, Jan. 1, 2002, pp. 415-437.

Moran et al., "Spatial Interpretation of Domain Objects Integrated into a Freeform Electronic Whiteboard", Proceedings of the 11th Annual ACM Symposium User Interface and Technology, UIST '98 , Nov. 1998, pp. 175-184.

Office Action for U.S. Appl. No. 11/849,469, dated Apr. 29, 2011, Kenneth P. Hinckley, "Flick-based in Situ Search From Ink, Text, or an Empty Selection Region".

Office Action for U.S. Appl. No. 11/849,469, dated Oct. 27, 2011, Kenneth P. Hinckley, "Flick-based in Situ Search From Ink, Text, or an Empty Selection Region", 22 pgs.

(56) References Cited

OTHER PUBLICATIONS

Office action for U.S. Appl. No. 11/849,469, dated Nov. 4, 2013, Hinckley, "Flick-based in Situ Search From Ink, Text, or an Empty Selection Region", 22 pages.
Office action for U.S. Appl. No. 11/849,469, dated Feb. 14, 2013, Hinckley, "Flick-based in Situ Search From Ink, Text, or an Empty Selection Region", 21 pages.
Office action for U.S. Appl. No. 11/849,469, dated Mar. 26, 2014, Hinckley, "Flick-based in Situ Search From Ink, Text, or an Empty Selection Region", 19 pages.
Office action for U.S. Appl. No. 11/849,469, dated Jun. 20, 2013, Hinckley , "Flick-based in Situ Search From Ink, Text, or an Empty Selection Region",20 pages.
Final Office Action for U.S. Appl. No. 11/849,469, dated Sep. 17, 2014, Kenneth P. Hinckley, "Flick-based in Situ Search From Ink, Text, or an Empty Selection Region", 19 pages.
Office action for U.S. Appl. No. 11/849,469, dated Sep. 25, 2012, Hinckley, "Flick-based in Situ Search From Ink, Text, or an Empty Selection Region", 23 pages.
International Search Report and Written Opinion dated Oct. 2, 2008 for PCT Application No. PCT/US2008/059517, 9 pages.
Price, et al., "Linking by Inking: Trailblazing in a Paper-like Hypertext", The 9th ACM Conference on Hypertext and Hypermedia, Pittsburgh, PA, USA, Jun. 20, 1998, pp. 30-39.
Sony VAIO UX50 Reviews Tablet PCs Reviews by CNET retrieved at <<http://reviews.cnet.com/SOny-VAIO_UX50/4505-3126 7-31958097 .html>> on Dec. 28, 2006, 6 pages.
Willis, et al., "Tablet PC's as Instructional Tools or the Pen is Mightier than the 'Board!", Proceedings of the th Conference on Information Technology Education, Oct. 28-30, 2004, pp. 153-159.

* cited by examiner

GESTURE-BASED SEARCHING

RELATED APPLICATION(S)

This application is a continuation of, and claims priority to, co-pending U.S. patent application Ser. No. 11/849,469, filed Sep. 4, 2007, entitled "Flick-based in Situ Search From Ink, Text, or an Empty Selection Region," the entirety of which is herein incorporated by reference. U.S. patent application Ser. No. 11/849,469 is related to U.S. application Ser. No. 11/733,113, entitled, "IN SITU SEARCH FOR ACTIVE NOTE TAKING," filed Apr. 9, 2007.

BACKGROUND

Technological advances associated with computers, the Internet and the World Wide Web have enabled users to instantly access a vast and diverse amount of information. As compared to traditional libraries or encyclopedias, information provided by way of the Web is decentralized in nature. To locate information of interest, a user can employ a search engine that facilitates finding content stored on local or remote computers. Search engines can assist in locating information on the public Web, intranets, personal computers, and the like. Typical search engines can retrieve a list of references (e.g., search results) matching inputted criteria provided by the user. For instance, the user can perform a query by providing a word or phrase to the search engine and in response the search engine can return a list of search results matching the entered word, phrase, or a portion thereof. To further specify search queries, many search engines support utilization of Boolean terms such as, for instance, AND, OR and NOT as well as provisions related to a distance between keywords.

The convergence of direct pen input devices, full text indexing of personal stores, and Internet search engines offers tremendous unexplored opportunities to design fluid user considered to be, for example, the combination of pen-and-ink note taking with searching, linking, collecting, and sense making activities. This is in contrast to simple note taking, which is characterized by moment-to-moment transcription. Active note taking for example is typically performed by knowledge workers engaged in challenging creative work such as scientific research, product design, or planning complex activities, and the like. The knowledge workers often create informal pre-production work artifacts on paper, in notebooks, or on whiteboards, sketching preliminary plans and manipulating their notes to find solutions to difficult problems.

In light of the above, personal information search and web-based search are trends with huge significance. More than ever, there are more and more documents, files, data, notes, etc. on computers and/or mobile devices such as a tablet, pocket PC, or smartphone. In addition, the amount of information available on the Internet continues to grow and is a compounding factor for the amount stored and accumulated data. Conventional techniques for querying and/or accessing such data are inefficient as attention is diverted to perform the search rather than on the task that instigated the search.

SUMMARY

The following presents a simplified summary of the innovation in order to provide a basic understanding of some aspects described herein. This summary is not an extensive overview of the claimed subject matter. It is intended to neither identify key or critical elements of the claimed subject matter nor delineate the scope of the subject innovation. Its sole purpose is to present some concepts of the claimed subject matter in a simplified form as a prelude to the more detailed description that is presented later.

The subject innovation relates to systems and/or methods that facilitate querying data based on a flick gesture. An in situ search component can receive a flick gesture via an interface, wherein the in situ search component can execute an in situ search with the flick gesture as a trigger. The in situ search component can implement at least one of the following upon the detection of a flick gesture: a search on a portion of selected data or a generation of a search query box. A portion of data (e.g., handwriting, text, characters, words, phrases, images, etc.) can be selected and queried upon the implementation of a flick gesture. Moreover, the flick gesture can provide a search query box to receive a query when there is an empty selection of data.

In accordance with another aspect of the subject innovation, the in situ search component can execute a search based on characteristics of the flick gesture. For example, the flick gesture can be evaluated by an evaluation component to identify flick gesture speed, flick gesture direction, and the like. Based on the characteristics of the flick gesture, the in situ search component can implement various types of searches. In still another aspect of the claimed subject matter, the in situ search component can utilize a graphic component that can generate an embeddable persistent graphical object with the flick gesture as a trigger. The embeddable persistent graphical object can be populated with search results for a query, a search query box for query input, previous searches, historic data, etc. In other aspects of the claimed subject matter, methods are provided that facilitate executing a command based on a direction of a received flick gesture.

The following description and the annexed drawings set forth in detail certain illustrative aspects of the claimed subject matter. These aspects are indicative, however, of but a few of the various ways in which the principles of the innovation may be employed and the claimed subject matter is intended to include all such aspects and their equivalents. Other advantages and novel features of the claimed subject matter will become apparent from the following detailed description of the innovation when considered in conjunction with the drawings.

DETAILED DESCRIPTION

Figure 1:
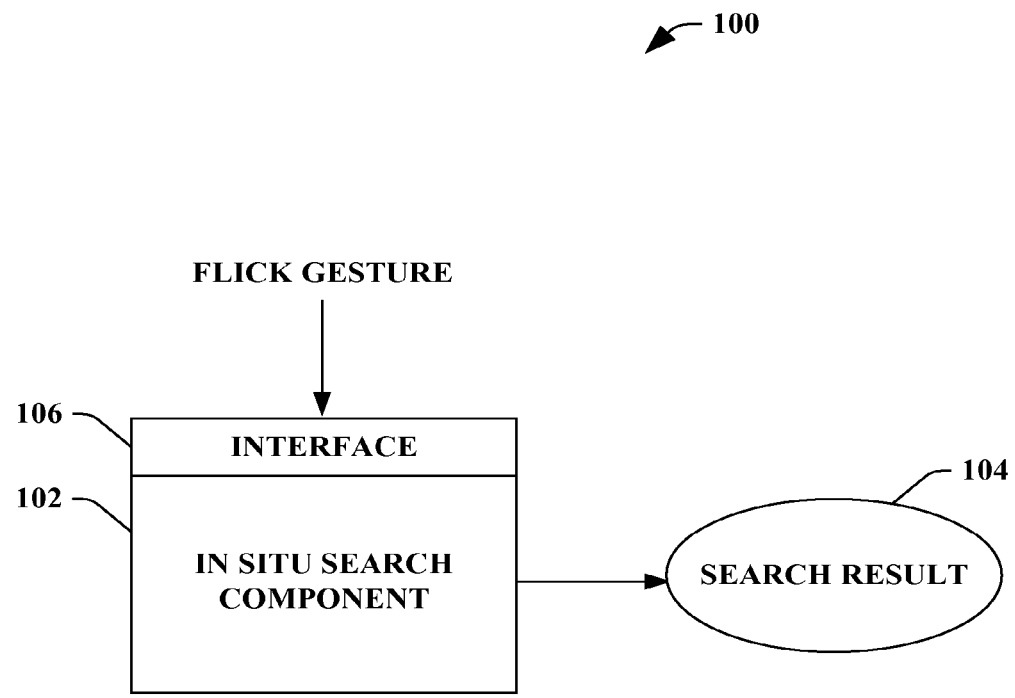
FIG. 1 illustrates a block diagram of an exemplary system that facilitates querying data based on a flick gesture.

The claimed subject matter is described with reference to the drawings, wherein like reference numerals are used to refer to like elements throughout. In the following description, for purposes of explanation, numerous specific details are set forth in order to provide a thorough understanding of the subject innovation. It may be evident, however, that the claimed subject matter may be practiced without these specific details. In other instances, well-known structures and devices are shown in block diagram form in order to facilitate describing the subject innovation.

As utilized herein, terms "component," "system," "interface," "input device," "application," and the like are intended to refer to a computer-related entity, either hardware, software (e.g., in execution), and/or firmware. For example, a component can be a process running on a processor, a processor, an object, an executable, a program, a function, a library, a subroutine, and/or a computer or a combination of software and hardware. By way of illustration, both an application running on a server and the server can be a component. One or more components can reside within a process and a component can be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter. Moreover, the word "exemplary" is used herein to mean serving as an example, instance, or illustration. Any aspect or design described herein as "exemplary" is not necessarily to be construed as preferred or advantageous over other aspects or designs.

Now turning to the figures, FIG. 1 illustrates a system 100 that facilitates querying data based on a flick gesture. The system 100 can include an in situ search component 102 that can receive a flick gesture via an interface component 106 (discussed below), wherein the flick gesture can trigger the execution of a search to return a search result 104. The in situ search component 102 can implement an in situ search or query on any suitable portion of data upon the detection of a flick gesture. It is to be appreciated and understood that the flick gesture can be a quick, linear movement associated with a scrolling action and/or command. Moreover, the flick gesture can be a linear movement that requires a user to provide a quick flicking motion with characteristics such as a high speed and a high degree of straightness. Such linear movements can correspond to an input device (not shown) such as, but not limited to, a tablet, a touch screen, a mouse, a touch pad, a trackball, and/or any other suitable input device capable of inputting a flick gesture. In addition, the in situ search component 102 can implement particular searches or queries based upon a direction of the flick gesture (discussed in more detail below). Upon receipt of the flick gesture via the interface component 106, the in situ search component 102 can provide a dynamic search on a portion of data in a seamless manner without disrupting a user's attention to his or her primary task prior to the search. It is to be further appreciated that the in situ search component 102 can provide a plurality of search results 104 and a single search result 104 is illustrated for the sake of brevity.

For example, a portion of text within a document can be selected by a user. The user can input a flick gesture in order to search with the selected text as a "seed" for the query. While the search is performed on the selected text, the user can continue to read the document without interruption of his or her task. Thus, the flick gesture activated search can be executed in the background so as to enable a user to seamlessly search documents, data, files, etc. In another example, a user can initiate a flick gesture and then a selection of data on which to perform the search. In other words, the flick gesture and the selection of data can be in any suitable order or sequence. In general, it is to be appreciated that the selection of data to query can be before and/or after the flick gesture.

In another aspect of the subject innovation, the in situ search component 102 can utilize a flick gesture as a trigger to prompt a user with a search query box to enter user-defined search. For example, a user can be examining a web page, perform a flick gesture, and be presented with a search query box in order to input user-defined data (e.g., handwriting, text, numbers, alphanumeric characters, etc.). The data inputted in the search query box can be a seed for a query in which to return at least one search result (e.g., search result 104). With such example, a user can quickly and efficiently search data with minimal interruption or distractions by the utilizing a flick gesture as a trigger to display a search query box.

In general, typical search functionality is slow to access and requires switching to a different application or a type-in box that is divorced from a user's focus of attention. As a result, the user often has to re-enter search terms that already existed directly in the context of a web page, a document, ink notes, etc. These barriers tend to deter users from issuing searches in the first place, resulting in lost opportunities for the user to quickly access related information. The system 100 alleviates a user of such headaches with the employment of flick-based in situ searches. The flick-based in situ searches implemented by the in situ search component 102 can eliminate these unnecessary steps and make it far simpler and quicker for users to go from having the thought of doing a search, to actually getting useful results on their screen/display.

In addition, the system 100 can include any suitable and/or necessary interface component 106 (herein referred to as "interface 106"), which provides various adapters, connectors, channels, communication paths, etc. to integrate the in situ search component 102 into virtually any operating and/or database system(s) and/or with one another. In addition, the interface 106 can provide various adapters, connectors, channels, communication paths, etc., that provide for interaction with the in situ search component 102, flick gestures, input devices, the search result 104, and any other device and/or component associated with the system 100.

Figure 2:
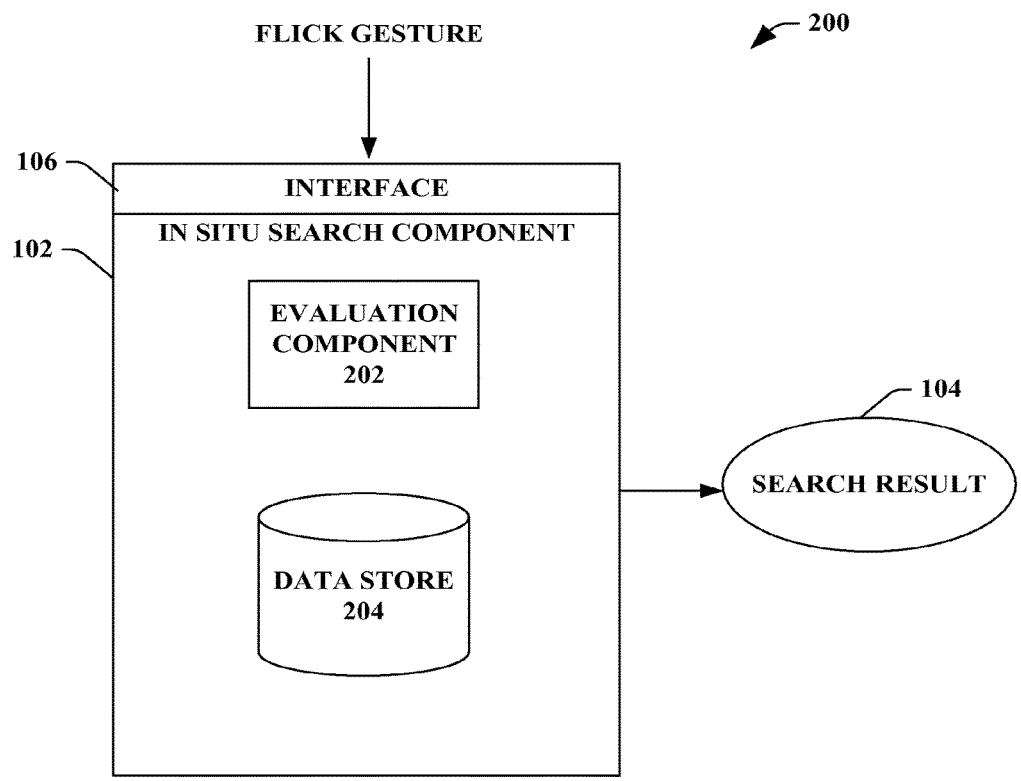
FIG. 2 illustrates a block diagram of an exemplary system that facilitates executing a command based on a direction of a received flick gesture.

FIG. 2 illustrates a system 200 that facilitates executing a command based on a direction of a received flick gesture. The system 200 can include the in situ search component 102 that can execute a search based upon the detection of a flick gesture via the interface 106. Upon such in situ search, the in situ search component 102 can provide at least one search result 104. For instance, a flick gesture can be performed with an input device in order to activate an in situ search to produce the search result 104, wherein such in situ search can be performed on at least one of 1) a portion of selected data; 2) a portion of data entered in a prompted search query box; or 3) any suitable combination thereof. Thus, for example, a user can select a portion of text on an email, perform a flick gesture, and be prompted with an additional search query box in which user entered text/data and the selected portion of text can be seeds for a query. Furthermore, the system 200 may employ the context of other surrounding words, in addition to those explicitly selected by the user, to specialize, personalize, or contextualize the search results (e.g., by re-ranking web search results) to suit the particular user, or the particular document in which the user triggered the search.

The system 200 can utilize an evaluation component 202 that can detect at least one of a flick gesture, a direction of a flick gesture, a speed of a linear input, a direction of a linear input, a location of a linear input, an area of a linear input, a data selection from an input device, and/or any other data related to an input from an input device. For example, the evaluation component 202 can continuously monitor an input device to detect a flick gesture. Once a flick gesture is identified, the in situ search component 102 can initiate a search or query by 1) executing a search on a portion of selected data; or 2) prompting a search query box for a user to fill. In another example, the evaluation component 202 can identify portions of data selected on which to search when triggered by a flick gesture. For instance, the evaluation component 202 can evaluate a location and/or area (e.g., handwriting, a portion of text, a portion of characters, a word, a phrase, a keyword, a sentence, a portion of an image, a graphic, a bitmap, or a portion of an icon, etc.) for which data is selected by the input device. In still another example, the evaluation component 202 can determine if a gesture is within a speed and/or direction threshold in order to be considered a flick gesture. Note that the evaluation component 202 may be a system component independent of individual applications; in this manner, the flick gesture serves as a system-wide gesture that supports all applications, rather than requiring individual applications to implement suitable search functionality.

In another example, the evaluation component 202 can identify a direction associated with the flick gesture, wherein the direction of the flick gesture can correlate to a particular type of in situ search. For example, it is to be appreciated that any suitable search can be implemented by the in situ search component 102 such as, but not limited to, a local search, a remote search, a file type based search (e.g., web site search, email search, document search, audio file search, search within a particular directory, storage volume, or an operating system construct such as a 'Start Menu', etc.), application-based search, etc. Thus, a particular flick gesture direction can correspond to a specific type of in situ search implemented by the in situ search component 102. For instance, an upward flick gesture can trigger a local search (e.g., local hard drive, desktop, folders, local networks, etc.), whereas a downward flick gesture can trigger a remote search (e.g., web pages, the Internet, remote networks, etc.). In other words, more than one flick gesture can be assigned to different types of search functionality such as desktop (e.g., personal information) search, web search, search within the current document (e.g., often exposed as a find feature), etc. Likewise, a single flick gesture can present various types of search results that are grouped together, or interspersed according to a ranking function, e.g. a results list with desktop search results, web search results, image search results, etc.

In addition, the evaluation component 202 can identify a flick gesture, wherein the in situ search component 102 can implement a correlating or mapped search command stored in a data store 204 (discussed in more detail below). For example, a collection of mappings can be stored on the data store 204, in which a flick gesture can correspond with a particular command. In one example, the mappings can include a flick gesture direction and corresponding search command (e.g., a diagonal upwards and right flick gesture translates to a local search, a diagonal downward left flick gesture translates to an email search, an upward flick gesture translates to a search within the opened file or file in which the gesture occurred, etc.).

As discussed, the system 200 can further include the data store 204 that can include any suitable data related to the in situ search component 102, the search result 104, an input device, etc. For example, the data store 204 can include, but not limited to including, mappings (e.g., flick gesture direction and corresponding command, etc.), thresholds for flick gesture qualification, search types, user settings, in situ search configurations, user preferences, graphical overlays (e.g., breadcrumb-discussed in more detail below, search query box, etc.), directional definitions for a flick gesture, historic data related to a search, and/or any other suitable data related to the system 200.

It is to be appreciated that the data store 204 can be, for example, either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable programmable ROM (EEPROM), or flash memory. Volatile memory can include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM). The data store 204 of the subject systems and methods is intended to comprise, without being limited to, these and any other suitable types of memory. In addition, it is to be appreciated that the data store 204 can be a server, a database, a hard drive, a pen drive, an external hard drive, a portable hard drive, and the like.

Figure 3:
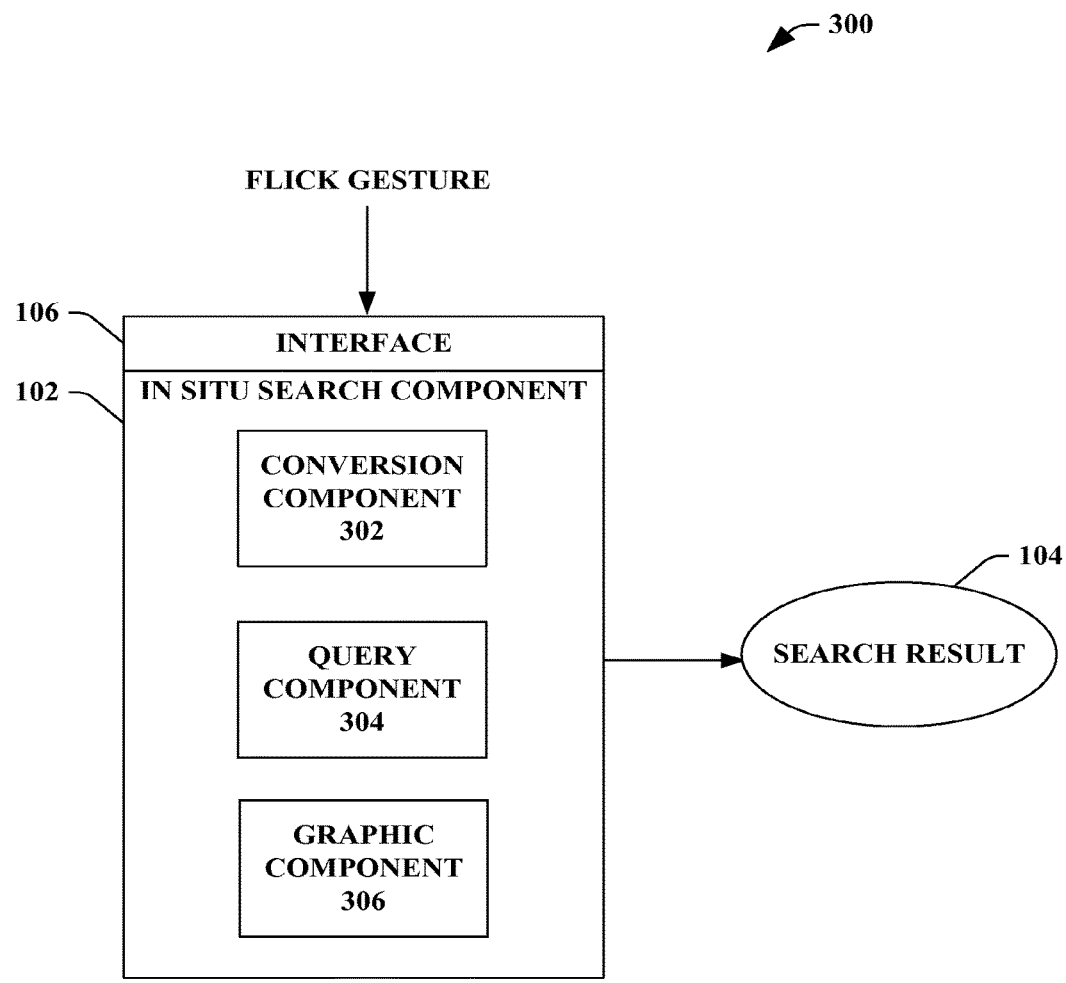
FIG. 3 illustrates a block diagram of an exemplary system that facilitates selecting a portion of data and initiating an in situ search based upon a flick gesture.

FIG. 3 illustrates a system 300 that facilitates selecting a portion of data and initiating an in situ search based upon a flick gesture. The system 300 can include the in situ search component 102 that employs a search or query based upon the detection of a flick gesture received via the interface 106. By using a flick gesture to trigger and execute an in situ search, attention can be maintained and focused rather than be diverted to perform a search. Once detected, a query can be performed on a selection of data to provide the search result 104. If a selection of data is absent, a user can be prompted to provide a selection and/or a search query box can be displayed to receive a query. The system 300 may present an initial list of desktop search results, sorted by age, if no query term is present so that all recent documents, emails, etc. are available as a default search that the user can then further filter down (e.g., by file type, author, date, etc) or further restrict by adding search terms to the query. For example, an empty data selection coupled with a flick gesture can return recent search results from a previous search in which a user can further filter down by adding a search term or by other data (e.g., file type, date, author, etc.).

The system 300 can include a conversion component 302 that can enhance a selected portion of data to perform a search, wherein the enhancement can be a digital conversion or handwriting conversion. For example, a portion of data can be selected and a flick gesture executed in order to search the portion of selected data. It is to be appreciated that the portion of data can be handwritten, typed, extracted from an image via optical character recognition techniques, and/ or any suitable combination thereof. The conversion component 302 can translate handwritten data, typed data, and/or any other suitable data identified in order to perform an in situ search.

Moreover, the conversion component 302 that can scan through inked handwritten script (e.g., graphemes, block, and/or cursive) and provide handwriting recognition to provide a digital form of the inked handwritten script. It is to be appreciated that the conversion component 302 can be used in conjunction with an artificial intelligence/machine learning component (not shown), or additionally and/or alternatively the conversion component 302 can itself comprise or include the intelligence/machine learning component. In general, there are several types of learning algorithms that can be utilized with respect to intelligence/ machine learning. In particular, conditional maximum entropy (maxent) models have been widely employed for a variety of tasks, including language modeling, part-of-speech tagging, prepositional phrase attachment, and parsing, word selection for machine translation, and finding sentence boundaries. They are also sometime called logistic regression models, maximum likelihood exponential models, log-linear models, and can be equivalent to a form of perceptions, or single layer neural networks. In particular, perceptrons that use the standard sigmoid function, and optimize for log-loss can be perceived as being equivalent to maxent.

Furthermore, the in situ search component 102 can include a query component 304 that can conduct searches of an individual user's search space (e.g., various persisting means associated with the user, such as hard drives associated with the processing device and/or distributed over Wide Area Networks (WANs), Local Area Networks (LANs), and/or Storage Area Networks (SANs), USB drives/memory sticks, and/or memory devices affiliated with the user and confederated with the processing device) as well as the Internet, based at least in part on the a digital form generated by conversion component 302. In other words, the query component 304 can be any suitable search engine that can search remote data, local data, and/or any suitable combination thereof to identify the search result 104. The search effectuated by query component 304 can be conducted as a background process in order to detract from the distracting effects such searches can have on individuals' concentration on the task at hand. Similarly, search results (e.g., search result 104) can be associated with a persistent and embeddable graphical object (discussed below) and can be immediately displayed or displayed at a later time depending on individual preference.

The system 300 can further utilize a graphic component 306 that can generate at least one of a persistent and embeddable graphical object or a search query box. As discussed, the search query box can be generated upon the detection of a flick gesture without any data selected and/or identified for a search or query. Without a selection of data, the search query box can be utilized in which a user can input specific terms, phrases, characters, etc. on which to perform a search. For example, if examining an email, a user can perform a flick gesture without any text selected (e.g., highlight, a circle, a lasso, an underline, a color, a box, an ellipse, etc.) which generates a search query box (embedded and persistent within the email) to enable a user to input query terms, characters, etc.

The persistent and embeddable graphical object can be a breadcrumb, for instance, to be displayed and populated with at least one of a contextual ambit of flagged words and/or phrases, search results (e.g., search result 104), previous searches, historic data, preferences in relation to the in situ search, etc. In general, the breadcrumb can be a small icon (e.g., graphical object) attached to a selection region, which a user can then tap or stroke on to select what type of search to perform, using a direction stroke, a pull-down menu, or any other suitable technique to choose among difference search options. Allowing searches to morph between different types in this manner encourages fluidity and curiosity-driven searches in different domains (e.g., starting with a desktop search, but then later transitioning to a web search if the desired information is not available from one's personal data store, local data, etc.).

In another aspect in accordance with the subject innovation, the graphical object (e.g., the breadcrumb, the search query box, etc.) can persist until it is explicitly deleted by a user. In another aspect, the graphical object (e.g., the breadcrumb, the search query box, etc.) can exist when a current selection is active. Generally, a user-selectable option can be offered to allow a user to decide which behavior is preferred.

Figure 4:
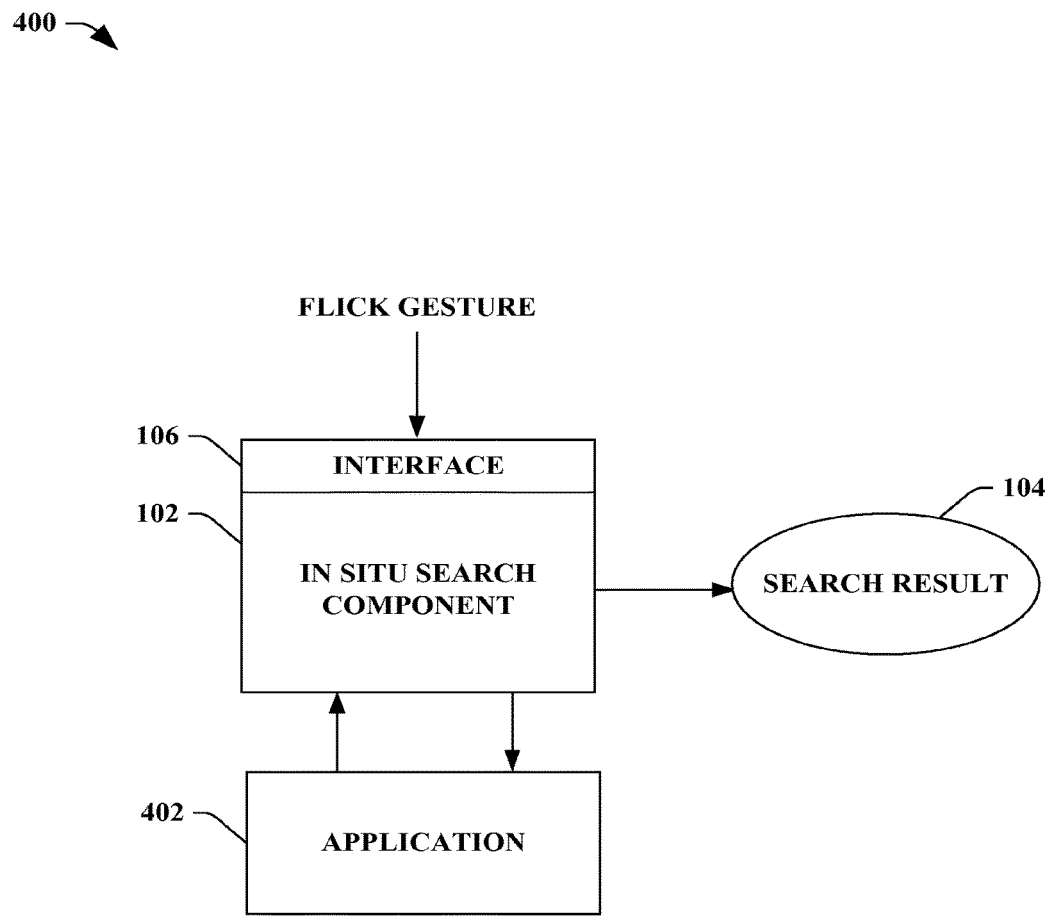
FIG. 4 illustrates a block diagram of an exemplary system that facilitates leveraging in situ search triggered by a flick gesture with an application.

FIG. 4 illustrates a system 400 that facilitates leveraging in situ search triggered by a flick gesture with an application. The system 400 enables a flick gesture to activate an in situ search to be performed on user-defined or selected data. The flick gesture can be a rapid and dependable out-of-band gesture that can offer consistent cross-application functionality for common system commands such as cut, copy, paste, undo, redo, etc. The flick gesture can further be utilized to trigger "context sensitive" commands that depend on the current selection (or lack thereof). Flick gestures can also be supported with various input devices (as discussed) such as mice, touch pads, trackballs, etc.

The system 400 can include an application 402 that can utilize and/or leverage the in situ search capabilities triggered by a flick gesture. It is to be appreciated that the application 402 can be any suitable portion of software, hardware, device, web site, web service, and/or any other suitable entity that can employ a flick gesture as a trigger for an in situ search or query. For example, a user or third-party application can define which flick direction supports which function. Thus, a diagonal flick may be the default offering, but any flick direction can be used to trigger a search. In another example, a third-party email application can include instructions and/or definitions that can enable a flick gesture to trigger a particular search associated with such email application. In addition, various settings, preferences, configurations, options, and the like (e.g., graphical object preferences, selection options, query defaults, sensitivity, direction of gesture, speed of gesture, etc.) can be further defined as default or personalized by a consumer. In general, it is to be appreciated that the flick gesture as a trigger for an in situ search can be seamlessly incorporated into the application 402.

Figure 5:
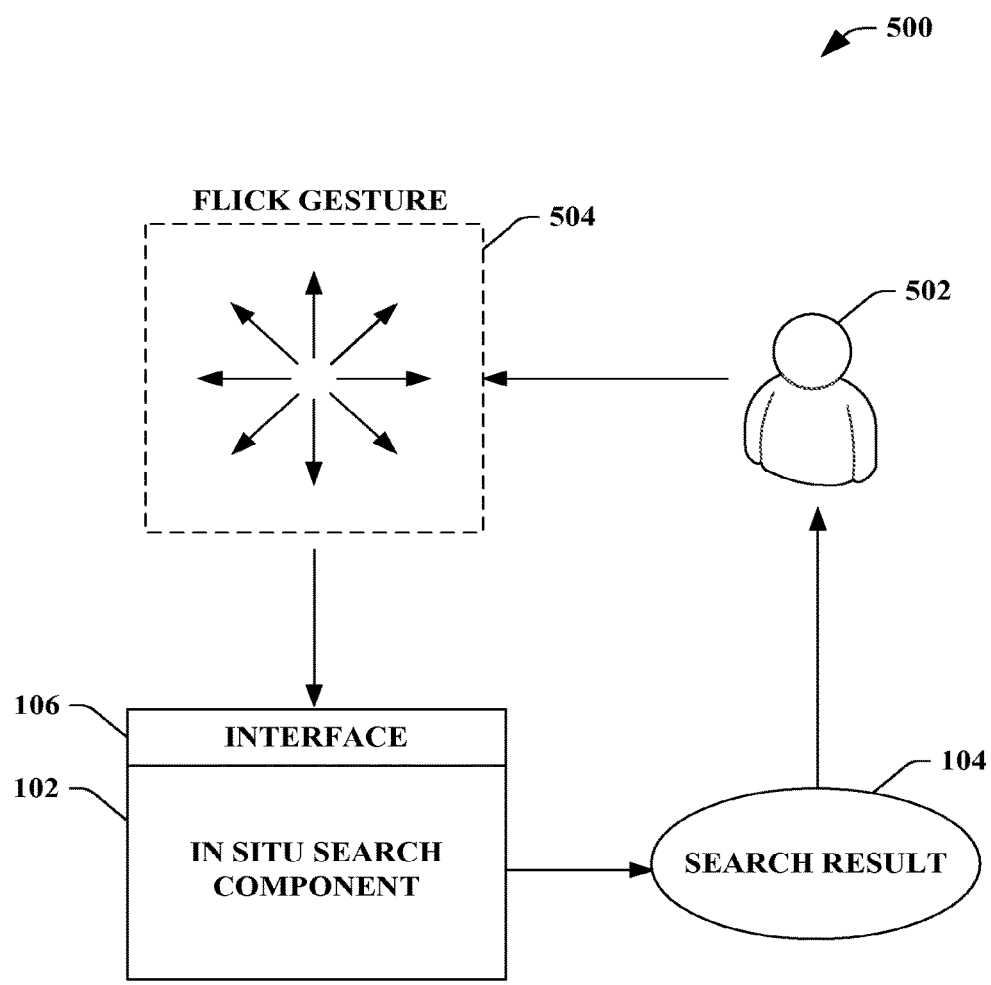
FIG. 5 illustrates a block diagram of exemplary system that facilitates implementing an in situ search from a user based on a gesture received by an input device.

FIG. 5 illustrates a system 500 that facilitates implementing an in situ search from a user based on a gesture received by an input device. The system 500 enables a flick gesture to trigger and initiate an in situ search related to data in a seamless manner. The system 500 can include the in situ search component 102 that can execute a search to provide the search result 104 upon the detection of a flick gesture. By utilizing the flick gesture to activate a search, querying data can be done without disrupting an initial task that instigated the search or desire to search.

The system 500 includes a user 502 that can interact with an input device (not shown). For example, a user can employ a pen or mouse to highlight a keyword or short phrase, and then perform a flick gesture 504 to launch a search based on that phrase or keyword. The user 502 can perform a flick gesture 504 in any suitable direction, wherein such flick gesture 504 can trigger an in situ search. It is to be appreciated that although eight directions are illustrated, the subject innovation can implement any suitable number of flick gesture directions in order to activate a search. In one particular example, the flick gesture 504 can be recognized along eight cardinal compass directions with primary directions assigned to various system functions and diagonal flick directions for search functions. The flick gesture 504 can be identified and/or received from the input device via the interface 106, in which the in situ search component 102 can employ a search to yield the search result 104 for the user 502.

For instance, the user 502 can select a portion of data and perform the flick gesture 504 to initiate a search. Thus, if there is no selection region at time of a flick gesture, the following can be employed: 1) an empty search query box can be generated in-place where the user can handwrite or type a query; or 2) a search query box can be generated that can be seeded with a word, if any, that falls under the pointer location at the start of the flick gesture. In the latter, the seeded query is "selected" by default, such that the user 502 can either proceed directly with this query or immediately start typing or writing on tope of it to overwrite the seeded query with a new one.

In another example, the user 502 can perform the flick gesture 504 to trigger a search without a prior selection of data. Thus, for example, if there is a prior selection, a selection can seed a subsequent flick-based query implementing at least one of the following: 1) the system 500 can pre-fetch a search result 104 for the seeded query and display them immediately in the assumption that the results represent the desired query; 2) the system 500 can pre-fetch when the user 502 forms any valid selection (e.g., before the user flicks to ask for search results) such that the search result 104 is available immediately without waiting for a search engine (e.g., query component discussed earlier) to return a result; 3) a type of result can depend on a selection region (e.g., short words or phrases can trigger keyword searches, selections of longer passages of text can perform a vector-based search for related documents, etc.); 4) a search can be offered as a flick command if there is a previous selection; 5) a selection can proceed from an ink stroke that are selected via a lasso selection (e.g., an input that encircles a portion of data) or other technique; 6) a selection may be a pure text string; or 7) a selection can be other context types that can seed valid queries (e.g., a selection of ink or text and a bitmap can trigger an image search by default, a selected object such as an icon representing an entire document can be selected for search, etc.).

Figure 6:
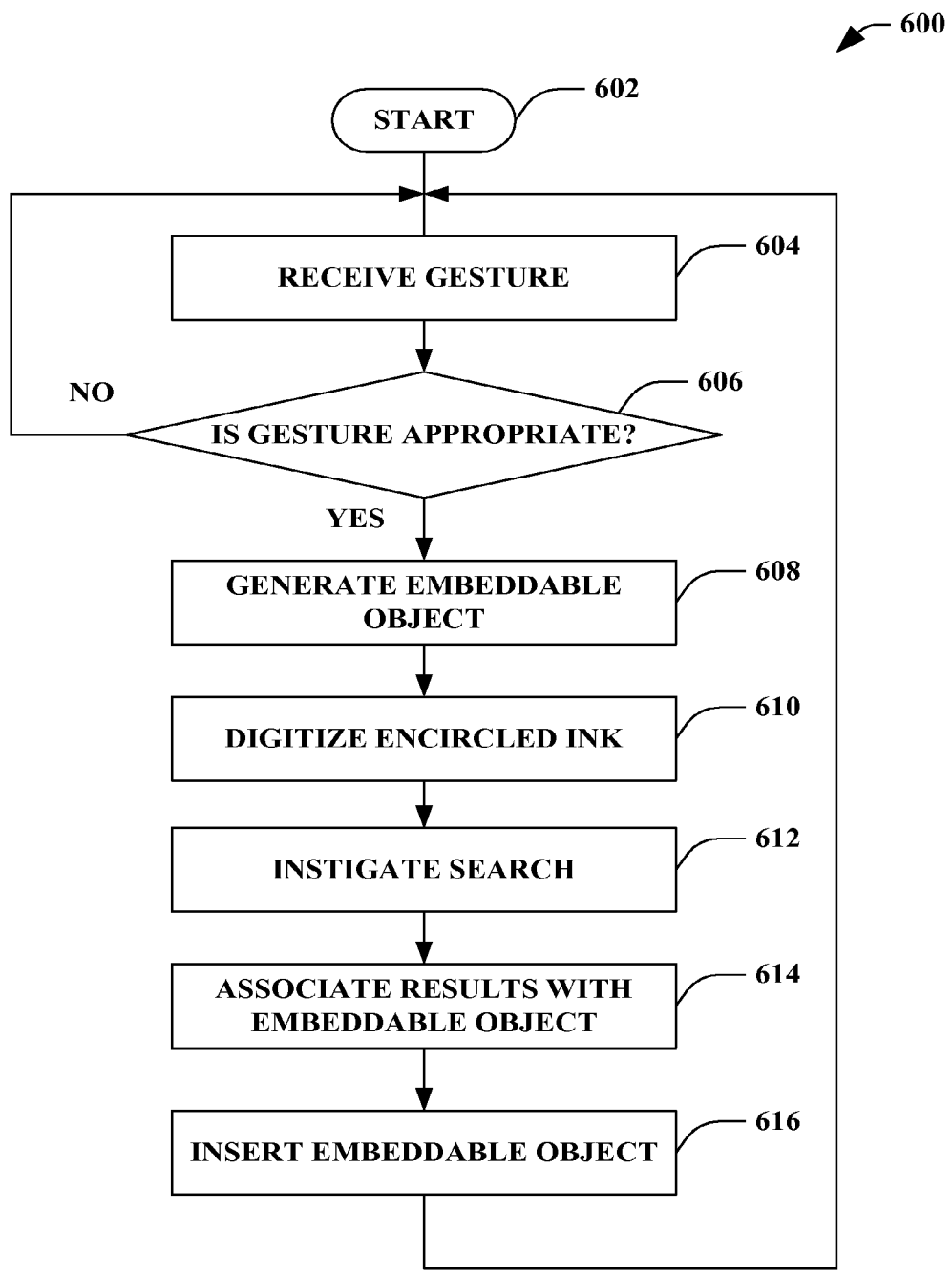
FIG. 6 illustrates an exemplary methodology for facilitating initiating an in situ search of data upon detection of a flick gesture.
Figure 7:
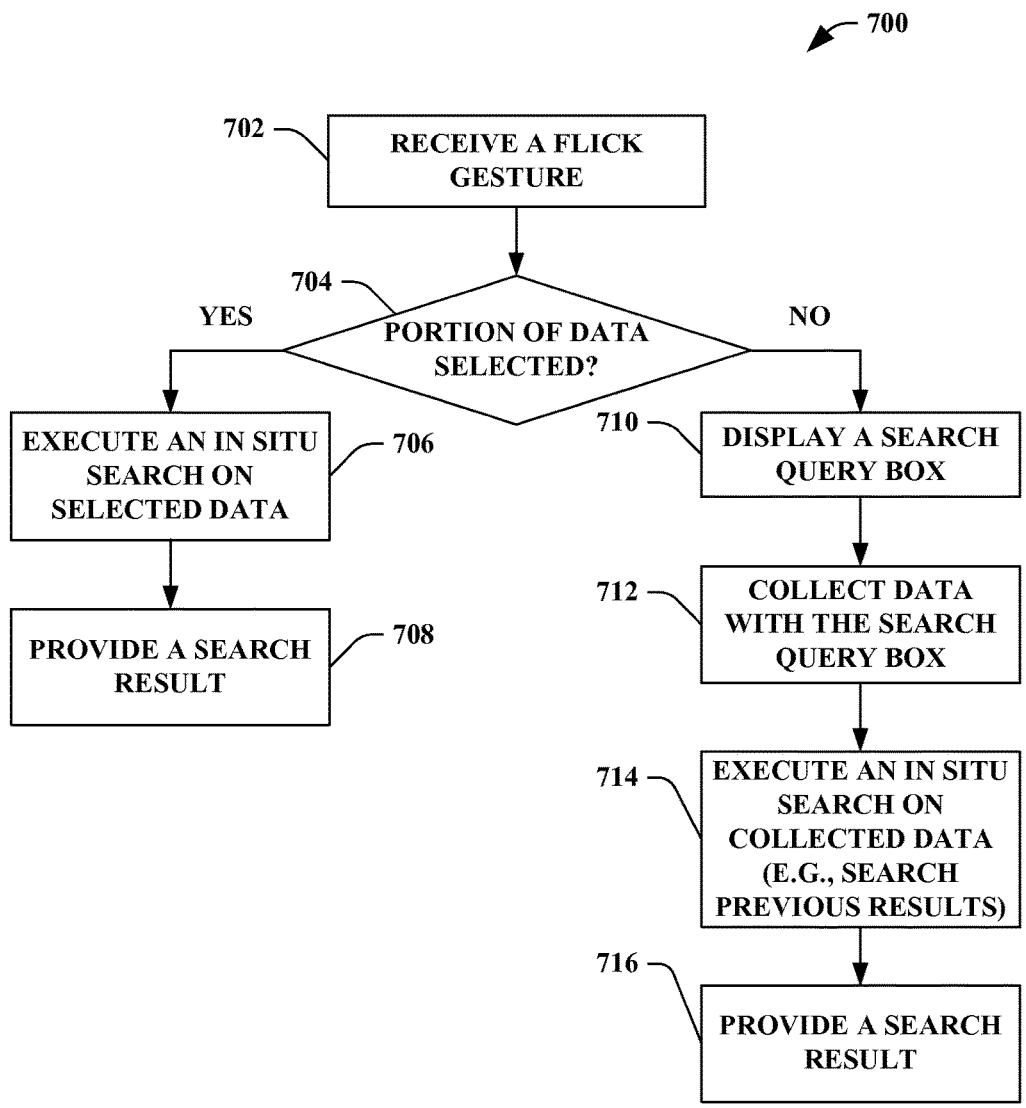
FIG. 7 illustrates an exemplary methodology for executing an in situ search on a portion of data or a received user-specified query.
Figure 8:
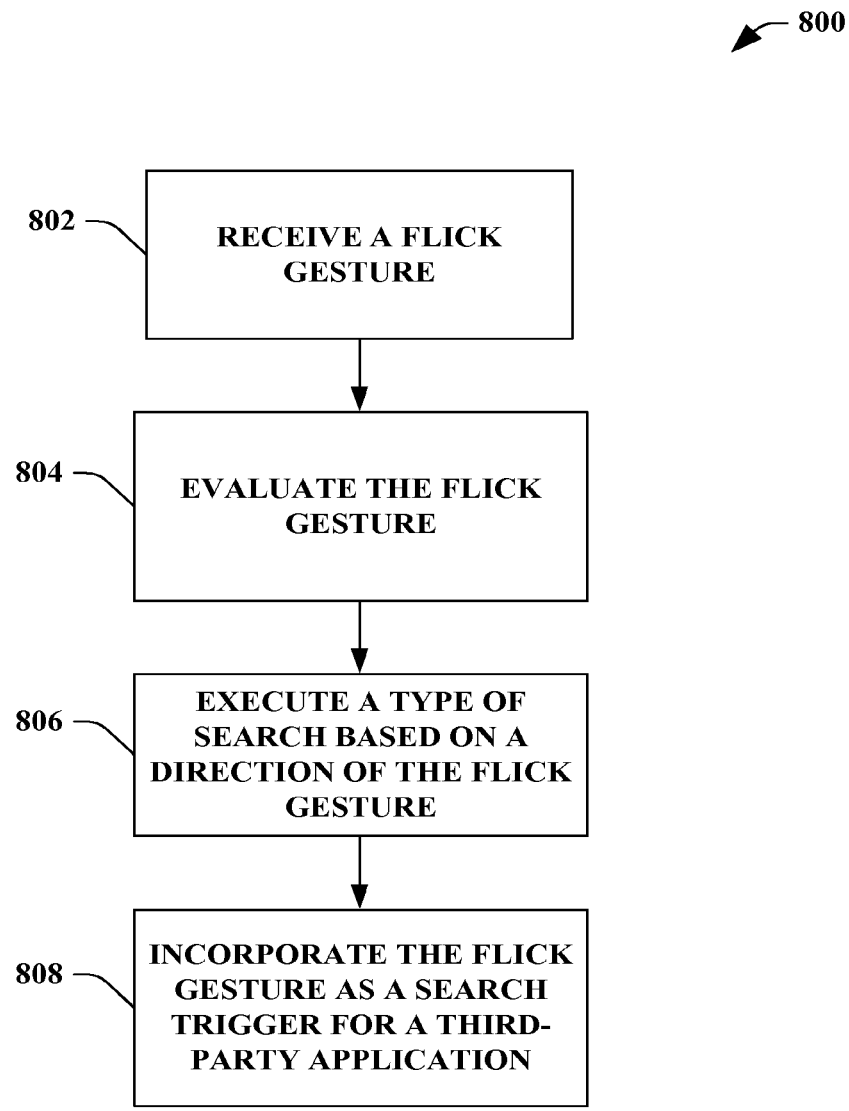
FIG. 8 illustrates an exemplary methodology that facilitates initiating a graphic overlay for in situ search based on a flick gesture.

FIGS. 6-8 illustrate methodologies and/or flow diagrams in accordance with the claimed subject matter. For simplicity of explanation, the methodologies are depicted and described as a series of acts. It is to be understood and appreciated that the subject innovation is not limited by the acts illustrated and/or by the order of acts. For example acts can occur in various orders and/or concurrently, and with other acts not presented and described herein. Furthermore, not all illustrated acts may be required to implement the methodologies in accordance with the claimed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

FIG. 6 illustrates a method 600 that facilitates initiating an in situ search of data upon detection of a flick gesture. The method 600 commences at reference numeral 602 where various processor initializations tasks and background activities are performed. After these tasks have been performed the method 600 can proceed to reference numeral 604 where a flick gesture can be received. The flick gesture can be a quick, linear movement associated with a scrolling action and/or command. Moreover, the flick gesture can be a linear movement that requires a user to provide a quick flicking motion with characteristics such as a high speed and a high degree of straightness. When a flick gesture is received, the method proceeds to reference numeral 606 where it is ascertained whether the flick gesture that was received pertains to the instigation of a search. Illustrative gestures that can indicate that users wish to instigate a search can include using, for example, a lasso gesture (e.g., encircling inked text), an underlining gesture and/or a sweeping gesture representative of highlighting the inked text, a flick gesture in a specific direction, a flick gesture with or without a portion of data selected, etc. If at reference numeral 606 it is determined that the gesture received does not comport with a pre-specified and/or cognizable gesture (e.g., NO) the method 600 can return to reference numeral 604 to await an appropriate gesture. Otherwise (e.g., YES) the method 600 proceeds to reference numeral 608 whereupon an embeddable graphical object (e.g., a breadcrumb) is generated.

An embeddable graphical object can be a visible representation of a query that acts as a handle placed in close proximity to, and/or logically attached to, ink that triggered the query. Nevertheless, it should be noted that embeddable graphical objects can be placed in any location desired by the user and/or heuristically determined by the system. In some aspects of the claimed subject matter, in less that a second and without interrupting the flow of a note taking task, a user can, for example "lasso" or "highlight" some ink to specify a search, and leave a search breadcrumb to be visited later. When the user returns, he/she can hover over the breadcrumb to see details, or to view the search results. Embeddable graphical objects or breadcrumbs serve as persisted reminders to revisit previous queries, and implicitly record a history of queries in the context of the notes that led to the search. Breadcrumbs can be cut, copied, pasted, selected, and/or moved around the user's notes. Breadcrumbs are furthermore persisted with the content itself (e.g. when saved as part of a digital notebook or note document).

The method 600 can proceed to reference numeral 610 where the inked text that has been selected (e.g., lassoed, highlighted, underlined, etc.) can be digitized and analyzed (e.g., lexically scanned to determine search terms). Digitizing and analysis of lassoed and/or highlighted ink can take the form of pattern recognition, optical character recognition, character recognition and/or handwriting analysis that can be carried out, for example, by a machine learning and/or artificial intelligence component.

After the lassoed and/or highlighted ink has been digitized and analyzed at reference numeral 610, the resultant digital form can be employed as parameter to instigate search functionality at reference numeral 612. The search can be run either as a foreground process or a background process. The choice of whether to have the search functionality execute in foreground or background can be a matter of individual preference. Regardless of whether the search is effectuated as a foreground or background process, the search can typically yield results that can be displayed immediately upon completion of the search or display of the results can be deferred to a more conducive time when the user is more receptive to viewing the results. Nevertheless, whatever the user preference in this regard (e.g., view the results immediately or alternatively defer viewing to a later time) the results of the search can be associated with the embeddable graphical object at reference numeral 614. Once the search results have been affiliated with the embeddable graphical object, the embeddable object together with the associated search results can be inserted at reference numeral 616 in a location contiguous or abutting the selected data (e.g., circled, highlighted ink, etc.) that instigated the search, at which point the methodology 600 cycles back to 604 to await further an additional flick gesture received from an input device. Furthermore the embeddable object itself may be scaled in proportion to the total size of the lasso, e.g. so that a small selection has a small embeddable object attached to it, but a large selection would have a full-sized embeddable object attached to it. The embeddable object furthermore may be tapped or stroked to select it, whereupon the user is free to explicitly move it elsewhere, or resize it larger or smaller, if desired.

FIG. 7 illustrates a method 700 that facilitates executing an in situ search on a portion of data or a received user-specified query. At reference numeral 702, a flick gesture can be received. For instance, the flick gesture can be received from an input device, wherein the input device can be, but is not limited to being, a tablet, a touch screen, a mouse, a touch pad, a trackball, a stylus and touch screen device, and/or any other suitable input device capable of inputting a flick gesture. At reference numeral 704, a determination is made whether a portion of data has been selected in combination with the flick gesture. If a portion of data is selected, the methodology 700 continues at reference numeral 706. It is to be appreciated that a portion of data (e.g., text, characters, images, etc.) can be selected with highlighting, underlining, lassoing, circling, and/or any other suitable technique to identify a portion of data with an input device. At reference numeral 706, an in situ search can be executed on the selected data. The in situ search can be implemented so as to not distract a user or shift attention. In other words, the search can be seamlessly initiated (e.g., in background, foreground, etc.). At reference numeral 708, a search result can be provided.

If a portion of data is not selected at reference numeral 704, the methodology 700 continues at reference numeral 710. At reference numeral 710, a search query box can be generated and displayed. The flick gesture can be a trigger to implement a search query box to enhance searching data. At reference numeral 712, a portion of data can be collected with the search query box. For example, a user can input text, characters, words, phrases, keywords, images, etc. At reference numeral 714, an in situ search can be executed on the collected portion of data. It is to be appreciated that the search can be performed in the background, the foreground, and/or any other suitable combination thereof. At reference numeral 716, a search result can be provided based upon the search.

FIG. 8 illustrates a method 800 for initiating a graphic overlay for in situ search based on a flick gesture. At reference numeral 802, a flick gesture can be received. For instance, the flick gesture can be a quick, linear movement associated with a scrolling action and/or command. Moreover, the flick gesture can be a linear movement that requires a user to provide a quick flicking motion with characteristics such as a high speed and a high degree of straightness. At reference numeral 804, the flick gesture can be evaluated. The flick gesture received can be evaluated in order to identify at least one of a speed, a direction, a location, an area, etc.

Continuing at reference numeral 806, a type of search can be executed based at least in part upon the flick gesture or the direction of the flick gesture. For example, it is to be appreciated that any suitable search can be implemented such as, but not limited to, a local search, a remote search, a file type based search (e.g., web site search, email search, document search, audio file search, etc.), application-based search, etc. For instance, an upward flick gesture can trigger a local search (e.g., local hard drive, desktop, folders, local networks, etc.), whereas a downward flick gesture can trigger a remote search (e.g., web pages, the Internet, remote networks, etc.).

At reference numeral 808, the flick gesture can be incorporated as a search trigger for a third-party application. It is to be appreciated that the third-party application can be any suitable portion of software, hardware, device, web site, web service, and/or any other suitable entity that can employ a flick gesture as a trigger for an in situ search or query. For example, a user or third-party application can define which flick direction supports which function. Thus, a diagonal flick may be the default offering, but any flick direction can be used to trigger a search. For instance, a third-party email application can include instructions and/or definitions that can enable a flick gesture to trigger a particular search associated with such email application.

Figure 9:
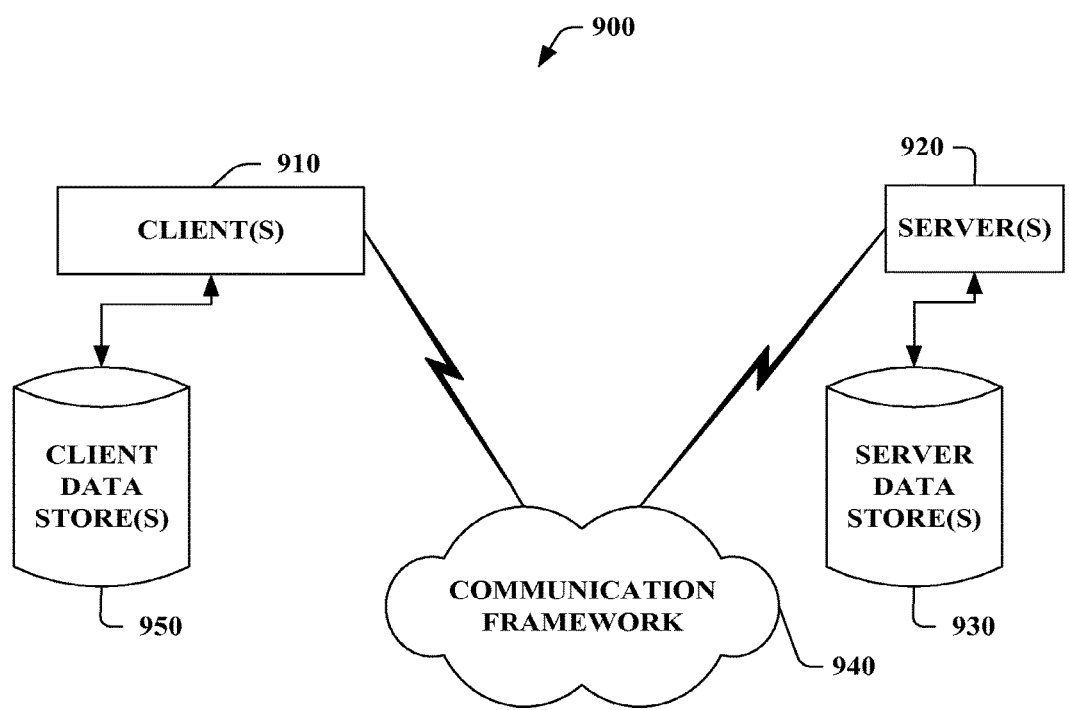
FIG. 9 illustrates an exemplary networking environment, wherein the novel aspects of the claimed subject matter can be employed.
Figure 10:
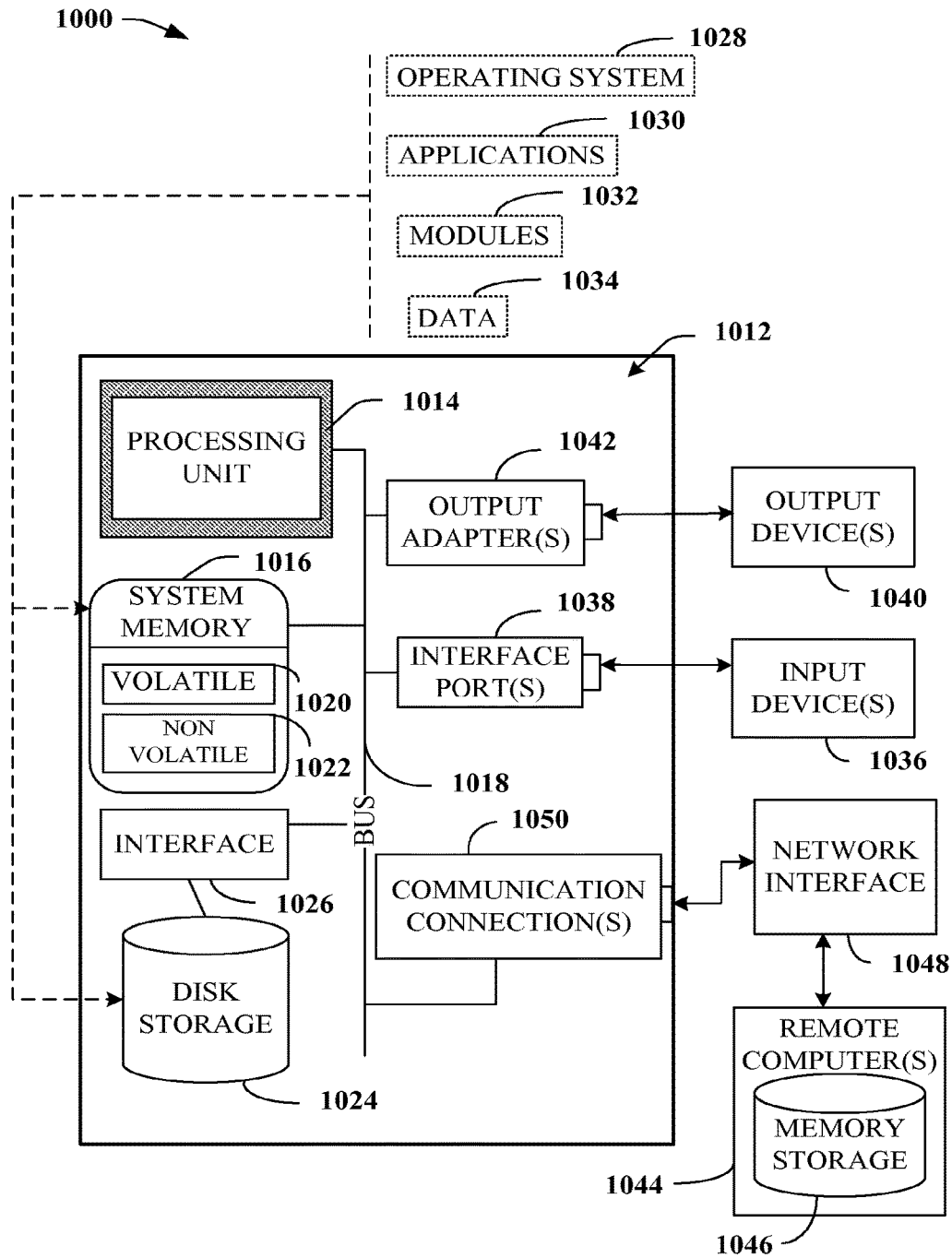
FIG. 10 illustrates an exemplary operating environment that can be employed in accordance with the claimed subject matter.

In order to provide additional context for implementing various aspects of the claimed subject matter, FIGS. 9-10 and the following discussion is intended to provide a brief, general description of a suitable computing environment in which the various aspects of the subject innovation may be implemented. For example, an in situ search component that can execute an in situ search based upon a flick gesture detection, as described in the previous figures, can be implemented in such suitable computing environment. While the claimed subject matter has been described above in the general context of computer-executable instructions of a computer program that runs on a local computer and/or remote computer, those skilled in the art will recognize that the subject innovation also may be implemented in combination with other program modules. Generally, program modules include routines, programs, components, data structures, etc., that perform particular tasks and/or implement particular abstract data types.

Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based and/or programmable consumer electronics, and the like, each of which may operatively communicate with one or more associated devices. The illustrated aspects of the claimed subject matter may also be practiced in distributed computing environments where certain tasks are performed by remote processing devices that are linked through a communications network. However, some, if not all, aspects of the subject innovation may be practiced on stand-alone computers. In a distributed computing environment, program modules may be located in local and/or remote memory storage devices.

FIG. 9 is a schematic block diagram of a sample-computing environment 900 with which the claimed subject matter can interact. The system 900 includes one or more client(s) 910. The client(s) 910 can be hardware and/or software (e.g., threads, processes, computing devices). The system 900 also includes one or more server(s) 920. The server(s) 920 can be hardware and/or software (e.g., threads, processes, computing devices). The servers 920 can house threads to perform transformations by employing the subject innovation, for example.

One possible communication between a client 910 and a server 920 can be in the form of a data packet adapted to be transmitted between two or more computer processes. The system 900 includes a communication framework 940 that can be employed to facilitate communications between the client(s) 910 and the server(s) 920. The client(s) 910 are operably connected to one or more client data store(s) 950 that can be employed to store information local to the client(s) 910. Similarly, the server(s) 920 are operably connected to one or more server data store(s) 930 that can be employed to store information local to the servers 920.

With reference to FIG. 10, an exemplary environment 1000 for implementing various aspects of the claimed subject matter includes a computer 1012. The computer 1012 includes a processing unit 1014, a system memory 1016, and a system bus 1018. The system bus 1018 couples system components including, but not limited to, the system memory 1016 to the processing unit 1014. The processing unit 1014 can be any of various available processors. Dual microprocessors and other multiprocessor architectures also can be employed as the processing unit 1014.

The system bus 1018 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 1016 includes volatile memory 1020 and nonvolatile memory 1022. The basic input/output system (BIOS), containing the basic routines to transfer information between elements within the computer 1012, such as during start-up, is stored in nonvolatile memory 1022. By way of illustration, and not limitation, nonvolatile memory 1022 can include read only memory (ROM), programmable ROM (PROM), electrically programmable ROM (EPROM), electrically erasable programmable ROM (EEPROM), or flash memory. Volatile memory 1020 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1012 also includes removable/non-removable, volatile/non-volatile computer storage media. FIG. 10 illustrates, for example a disk storage 1024. Disk storage 1024 includes, but is not limited to, devices like a magnetic disk drive, floppy disk drive, tape drive, Jaz drive, Zip drive, LS-100 drive, flash memory card, or memory stick. In addition, disk storage 1024 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1024 to the system bus 1018, a removable or non-removable interface is typically used such as interface 1026.

It is to be appreciated that FIG. 10 describes software that acts as an intermediary between users and the basic computer resources described in the suitable operating environment 1000. Such software includes an operating system 1028. Operating system 1028, which can be stored on disk storage 1024, acts to control and allocate resources of the computer system 1012. System applications 1030 take advantage of the management of resources by operating system 1028 through program modules 1032 and program data 1034 stored either in system memory 1016 or on disk storage 1024. It is to be appreciated that the claimed subject matter can be implemented with various operating systems or combinations of operating systems.

A user enters commands or information into the computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port may be used to provide input to computer 1012, and to output information from computer 1012 to an output device 1040. Output adapter 1042 is provided to illustrate that there are some output devices 1040 like monitors, speakers, and printers, among other output devices 1040, which require special adapters. The output adapters 1042 include, by way of illustration and not limitation, video and sound cards that provide a means of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a personal computer, a server, a router, a network PC, a workstation, a microprocessor based appliance, a peer device or other common network node and the like, and typically includes many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1050 refers to the hardware/software employed to connect the network interface 1048 to the bus 1018. While communication connection 1050 is shown for illustrative clarity inside computer 1012, it can also be external to computer 1012. The hardware/software necessary for connection to the network interface 1048 includes, for exemplary purposes only, internal and external technologies such as, modems including regular telephone grade modems, cable modems and DSL modems, ISDN adapters, and Ethernet cards.

What has been described above includes examples of the subject innovation. It is, of course, not possible to describe every conceivable combination of components or methodologies for purposes of describing the claimed subject matter, but one of ordinary skill in the art may recognize that many further combinations and permutations of the subject innovation are possible. Accordingly, the claimed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable medium having computer-executable instructions for performing the acts and/or events of the various methods of the claimed subject matter.

There are multiple ways of implementing the present innovation, e.g., an appropriate API, tool kit, driver code, operating system, control, standalone or downloadable software object, etc. which enables applications and services to use the advertising techniques of the invention. The claimed subject matter contemplates the use from the standpoint of an API (or other software object), as well as from a software or hardware object that operates according to the advertising techniques in accordance with the invention. Thus, various implementations of the innovation described herein may have aspects that are wholly in hardware, partly in hardware and partly in software, as well as in software.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

What is claimed is:

1. A method comprising:
   receiving, via an input device, a flick gesture, the flick gesture comprising a continuous non-marking substantially linear gesture;
   in response to the received flick gesture, determining if one or more search terms displayed in an interface is selected;
   when one or more search terms is selected, performing a search using the selected one or more search terms; and
   when one or more search terms is not selected,
     causing a search query box to be displayed in the interface;
     receiving one or more search terms through the search query box; and
     performing a search using the one or more search terms received through the search query box.

2. The method of claim 1, further comprising:
   prior to receiving the flick gesture, receiving, via the input device, a highlighting instruction to highlight content displayed in the interface, the highlighting comprising selecting the one or more search terms; and
   causing the highlighted content to be displayed in the interface.

3. The method of claim 1, further comprising:
   prior to receiving the flick gesture, receiving, via the input device, an underlining instruction to underline content displayed in the interface, the underlining comprising selecting the one or more search terms; and causing the underlined content to be displayed in the interface.

4. The method of claim 1, further comprising:

prior to receiving the flick gesture, receiving, via the input device, a circling instruction to circle displayed content in the interface, the circling comprising selecting the one or more search terms; and causing a circle to be displayed around the content.

5. The method of claim 1, wherein the input device comprises at least one of a touch screen or a touch pad.

6. A computing device comprising:

one or more processors; and memory for storing instructions, that when executed by the one or more processors, cause the computing device to:

detect a flick gesture and at least one of a direction of the flick gesture or a speed of the flick gesture, the flick gesture comprising a continuous non-marking substantially linear gesture;

receive a user input;

determine if the user input comprises a selection of one or more search terms;

when one or more search terms is selected and based on the detected flick gesture and the at least one of the direction, the speed, or the location of the flick gesture, perform a particular type of search using the user input and in response to the performed search, provide one or more search results to an output device; and when one or more search terms is not selected,
cause a search query box to be displayed in the interface;
receive one or more search terms through the search query box; and
perform a search using the one or more search terms received through the search query box.

7. The computing device of claim 6, wherein the one or more search terms comprises at least one of one or more textual terms or one or more images.

8. The computing device of claim 6, wherein the instructions further cause the computing device to:

process a highlighting instruction, received via an input device, to highlight content displayed in an interface, the highlighting instruction comprising the user input and the highlighted content comprising a selection of the one or more search terms; and display, in the interface, the highlighted content.

9. The computing device of claim 6, wherein the instructions further cause the computing device to:

process an underlining instruction, received via an input device, to underline content displayed in an interface, the underling instruction comprising the user input and the underlined content comprising a selection of the one or more search terms; and display, in the interface, the underlined content.

10. The computing device of claim 6, wherein the instructions further cause the computing device to:

process a circling instruction, received via an input device, to circle content displayed in an interface, the circling instruction comprising the user input and the circled content comprising a selection of the one or more search terms; and display, in the interface, a circle around the content.

11. The computing device of claim 6, wherein the input device comprises at least one of a touch screen or a touch pad and the output device comprises at least one of a display, a printer, or a speaker.

12. The computing device of claim 6, wherein the user input is received from a search query box.

13. The computing device of claim 6, wherein:

detecting the flick gesture and the at least one of the direction of the flick gesture or the speed of the flick gesture comprises detecting the flick gesture and at least one of the direction of the flick gesture, the speed of the flick gesture, or a location of the flick gesture; and the search comprises a particular type of search that is determined by the at least one of the direction, the speed, or the location of the flick gesture, the particular type of search included in a plurality of different types of searches.

14. A system comprising:

an input device;

one or more processors; and memory for storing instructions, that when executed by the one or more processors, cause the system to perform a method, comprising:

receiving, via the input device, a flick gesture, the flick gesture comprising a continuous substantially linear gesture;

in response to the flick gesture,
based on a selection of one or more search terms displayed in an interface, performing a search using the one or more search terms; and
based on a non-selection of one or more search terms, causing a search query box to be displayed in the interface; receiving one or more search terms through the search query box; and performing a search using the one or more search terms received through the search query box; and in response to the performed search, providing one or more search results to an output device.

15. The system of claim 14, wherein the method further comprises:

processing a highlighting instruction, received via the input device, to highlight content displayed in the interface, the highlighting comprising selecting the one or more search terms; and displaying, in the interface, the highlighted content.

16. The system of claim 14, wherein the method further comprises:

processing an underlining instruction, received via the input device, to underline content displayed in the interface, the underlining comprising selecting the one or more search terms; and displaying, in the interface, the underlined content.

17. The system of claim 14, wherein the method further comprises:

processing a circling instruction, received via the input device, to circle content displayed in the interface, wherein the circling comprises selecting the one or more search terms; and displaying, in the interface, the circled content.

18. The system of claim 14, wherein the input device comprises at least one of a touch screen or a touch pad and the output device comprises at least one of a display, a printer, or a speaker.

19. The system of claim 14, wherein the method further comprises prior to performing the search, receiving the selection of the one or more search terms.

20. The system of claim 14, wherein the one or more search terms displayed in the interface are selected prior to receiving the flick gesture.

* * * * *